(12) United States Patent
Federkevic et al.

(10) Patent No.: US 8,590,182 B2
(45) Date of Patent: Nov. 26, 2013

(54) APPARATUS AND METHOD FOR PET RE-ENTRY REMINDERS

(76) Inventors: Slavomir Federkevic, Winnipeg (CA); Karen M. Kolbe, Winnipeg (CA)

(*) Notice: Subject to any disclaimer, the term of this patent is extended or adjusted under 35 U.S.C. 154(b) by 281 days.

(21) Appl. No.: 13/014,863

(22) Filed: Jan. 27, 2011

(65) Prior Publication Data

US 2011/0185982 A1  Aug. 4, 2011

Related U.S. Application Data

(60) Provisional application No. 61/299,734, filed on Jan. 29, 2010.

(51) Int. Cl.
*G09F 3/00* (2006.01)
(52) U.S. Cl.
USPC .......................... 40/124.03; 40/331; 119/712
(58) Field of Classification Search
USPC .................. 119/843, 708, 501, 502, 702, 718; D20/40; 49/29; 368/10, 12
See application file for complete search history.

(56) References Cited

U.S. PATENT DOCUMENTS

| | | | | |
|---|---|---|---|---|
| 1,865,743 A | * | 7/1932 | Cody et al. | 116/9 |
| 4,216,598 A | * | 8/1980 | Newbert | 40/331 |
| 5,518,404 A | * | 5/1996 | Steele | 434/238 |
| 5,712,623 A | * | 1/1998 | Kumai et al. | 340/565 |
| D408,860 S | * | 4/1999 | Ho | D19/90 |
| D409,249 S | * | 5/1999 | Johnson | D20/18 |
| D413,356 S | * | 8/1999 | Ingram | D20/42 |
| 6,273,579 B1 | * | 8/2001 | Holloway | 362/100 |
| 2005/0225951 A1 | * | 10/2005 | Kurakami | 361/749 |
| 2008/0156274 A1 | * | 7/2008 | Andrade et al. | 119/484 |
| 2008/0170741 A1 | * | 7/2008 | Sceery | 381/387 |

* cited by examiner

*Primary Examiner* — Rob Swiatek
*Assistant Examiner* — Justin Benedik
(74) *Attorney, Agent, or Firm* — Kyle R. Satterthwaite; Ryan W. Dupuis; Ade & Company Inc.

(57) ABSTRACT

A reminder apparatus and method are employed to by a dwelling occupant to provide a reminder concerning a pet's whereabouts. The apparatus features a carrier member that is adapted to hang from a door knob or handle, and a timer device is supported on the carrier member and operable to indicate expiration of an interval of time from a selected starting point. When the occupant lets the pet outside, they activate the countdown function of the timer and an alarm sounds when the countdown expires, providing a reminder to let the pet back inside the dwelling. Indications of an indoor and outdoor status are provided on opposing sides of the carrier member, so that reversing of the facing direction of the carrier member every time the pet transfers between the indoors and outdoors results in an ongoing accurate indication of whether the animal is inside or out.

3 Claims, 3 Drawing Sheets

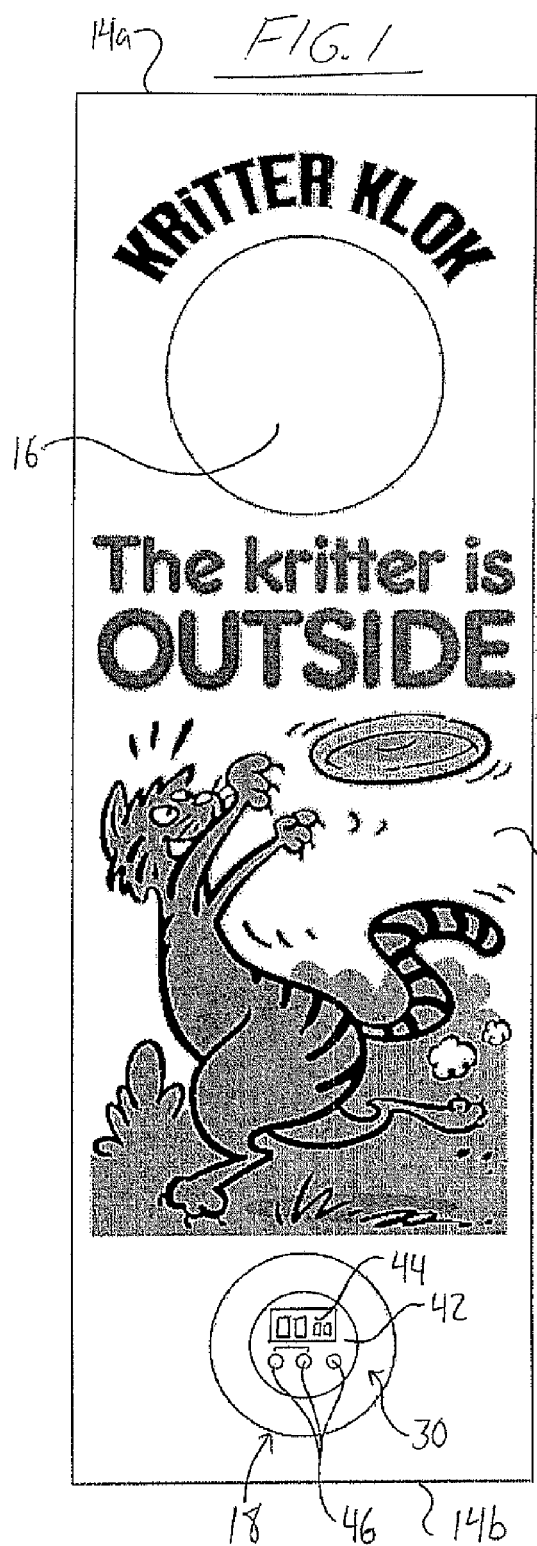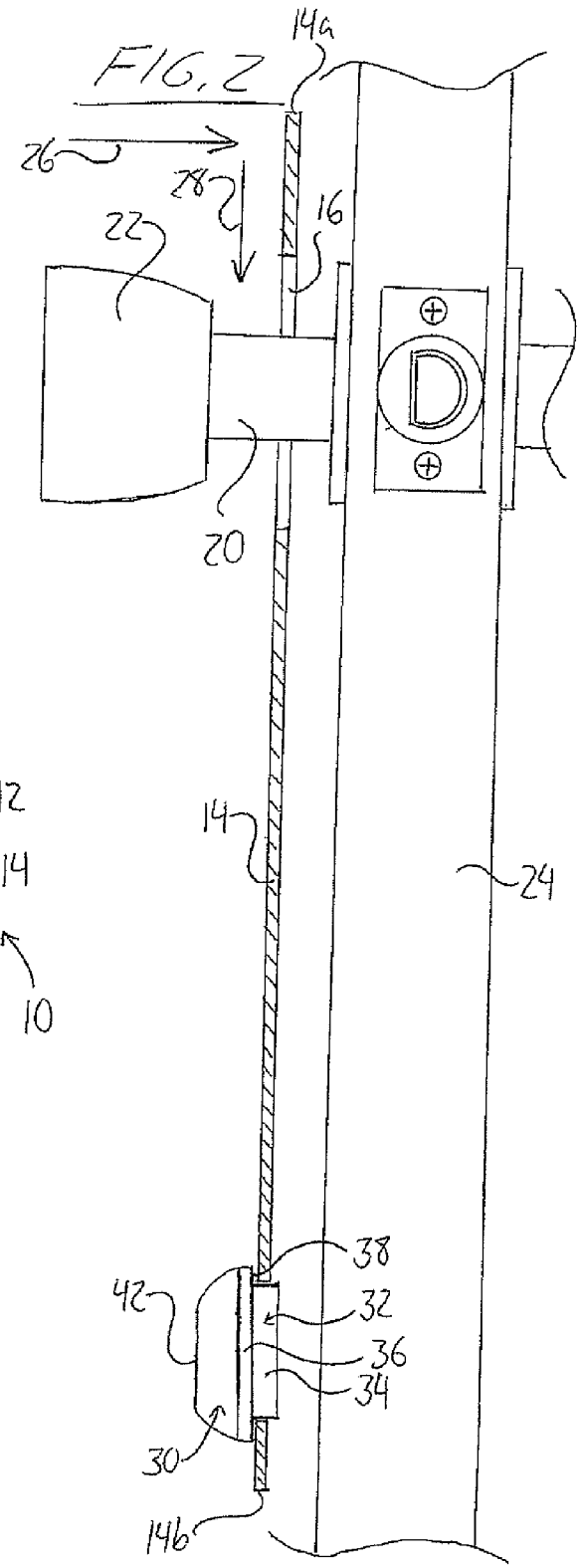

US 8,590,182 B2

APPARATUS AND METHOD FOR PET RE-ENTRY REMINDERS

CROSS-REFERENCE TO RELATED APPLICATIONS

This application claims benefit under 35 U.S.C. 119(e) of U.S. Provisional Patent Application Ser. No. 61/299,734, filed Jan. 29, 2010.

FIELD OF THE INVENTION

The present invention relates to a method and apparatus for reminding a pet owner to allow their pet back inside after a trip outdoors.

BACKGROUND OF THE INVENTION

Many pet owners keep their pets primarily indoors, only periodically letting them outdoors for a limited duration of time for expending of bodily waste, exercising, fresh air or other purposes. A problem that may arise is that a pet owner may become otherwise occupied and forget to let the pet back into the home. This may pose risks or problems to one or both of the animal and owner. For example, in cold weather climates, leaving an animal outdoors that is accustomed to warmer indoor temperatures can be risky for the animal and cause feelings of guilt for the owner even if the animal does not suffer any physical consequences from the exposure to the cold. Other possible issues may arise, as an animal left alone outdoors for an extended period may be more likely to run away, leading to increased chances of violent altercations with other animals or potential harm by exposure to vehicular traffic.

Accordingly, there is a desire for ways to better monitor the whereabouts of household animals occasionally or periodically let outdoors without direct supervision to ensure that they safely return indoors.

SUMMARY OF THE INVENTION

According to a first aspect of the invention there is provided an apparatus for reminding an occupant of a dwelling to facilitate re-entry of a pet having previously exited the dwelling, the apparatus comprising:

a carrier device adapted for support on a handle carrying portion of a door latching mechanism; and a timer device supported on the carrier device and operable to provide an indication of an expiration of an interval of time from a selected starting point.

Preferably the carrier device defines a hook feature adapted for placement over the handle carrying portion of the door latching mechanism to hang the carrier device therefrom.

Preferably the hook feature of the carrier device comprises a through-hole in the carrier sized to fit around the handle-carrying portion of the door latching mechanism.

Preferably the carrier device comprises a planar member.

Preferably the timer device is arranged to provide an audible indication of the expiration of the internal of time.

Preferably the timer device is arranged to facilitate setting of a user-selected interval of time.

Preferably the timer device comprises a programmable electronic timer.

According to a second aspect of the invention there is provided a method for reminding an occupant of a dwelling to facilitate re-entry of a pet having previously exited the dwelling, the method comprising:

(a) hanging a timer device at an indoor position hanging from a handle carrying portion of a door latching mechanism inside the dwelling, and providing input to the timer device to mark a starting point from which an interval of time is to elapse before the timer provides an indication that the interval of time has expired;

(b) recognizing an alarm signal emitted by the timer device upon expiry of the interval of time as a reminder to let the pet back inside the dwelling; and (c) in response to the alarm, manually facilitating re-entry of the pet into the dwelling.

Preferably the door latching mechanism from which the timer device is hung is installed on an interior side of an exterior door of the dwelling.

Preferably step (b) comprises manually opening the exterior door at which the timer device was hung in step (a) and allowing re-entry of the pet through said exterior door.

Preferably step (a) comprises setting a user-selected interval of time before marking the starting point from the interval of time is to elapse.

Preferably the alarm signal comprises an audible indication that the interval of time has expired.

According to a third aspect of the invention there is provided an apparatus for informing or reminder an occupant of a dwelling of a pet's whereabouts in terms of an indoor or outdoor status relative to said dwelling, the apparatus comprising a hanging device arranged for hanging from an object and having front and rear faces facing opposing directions, a first indicator on the front face indicative of an indoor status of a pet's whereabouts and a second indicator on the rear face indicative of an outdoor status of the pet's whereabouts.

Preferably each indicator comprises a printed message.

Preferably the first and second indicators respectively comprise images of an animal situated within indoor and outdoor environments respectively.

According to a fourth aspect of the invention there is provided a method for informing or reminder an occupant of a dwelling of a pet's whereabouts in terms of an indoor or outdoor status relative to said dwelling, the method comprising:

hanging a device having front and rear faces facing opposing directions, a first indicator on the front face indicative of an indoor status of a pet's whereabouts and a second indicator on the rear face indicative of an outdoor status of the pet's whereabouts;

flipping the device around each time the pet transitions between inside the dwelling and outside the dwelling to change which of the front and rear faces is visible from a particular vantage point so that the front face is visible when the pet in indoors and the rear face is visible when the pet is outdoors.

BRIEF DESCRIPTION OF THE DRAWINGS

In the accompanying drawings, which illustrate an exemplary embodiment of the present invention:

FIG. 1 is a front elevational view of a timer-equipped reminder apparatus to be hung on the handle or knob supporting shaft of a door's latching mechanism to visually and audibly remind a pet owner to let their pet back indoors.

FIG. 2 is a side elevational view showing of the apparatus of FIG. 1 during placement thereof onto the knob supporting shaft of a door, with a planar timer-carrying member of the apparatus cut-away to illustrate mounting of the timer thereon.

DETAILED DESCRIPTION

Figure 4:
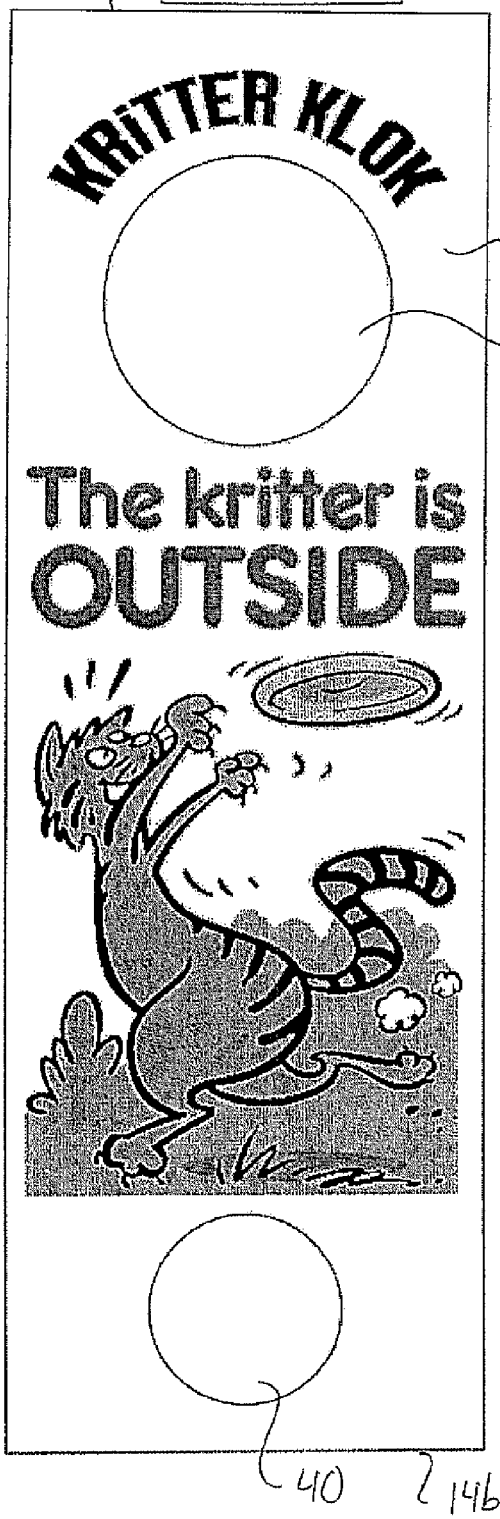
FIG. 4 is a front elevational view of the planar timer-carrying member of the apparatus.
Figure 3:
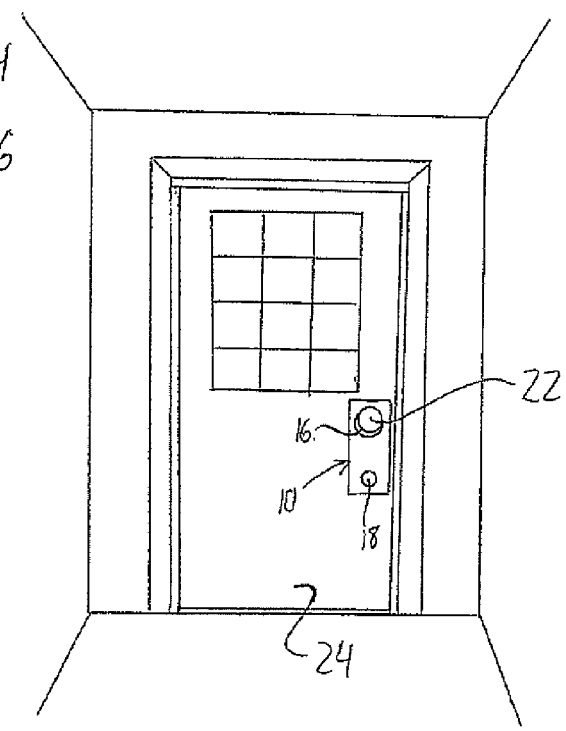
FIG. 3 is a perspective view of an apparatus of the present invention in use, hung on the knob supporting shaft on the interior side of an exterior door of a dwelling.

FIG. 1 shows a reminder apparatus 10 for hanging from the shaft on which the knob or handle of a door latching mechanism is carried in order to provide a user with both a visual and audible reminder after an interval of time has expired after a pet has been outside of the dwelling occupied by the user. The apparatus 10 features a carrier device 12 provided in the form of a planar rectangular member 14 having a circular through-hole 16 therein a short distance below an upper horizontal perimeter edge 14a of the planar member 14. The hole 16 is of sufficient size to accommodate passage of a doorknob through it, and accordingly has a diameter exceeding the largest of a known range of diameters of commercially available doorknobs. At a short distance above a lower horizontal perimeter edge 14b of the planar member 14, an electronic timer device 18 is secured within another opening in the planar member 14 in order to be carried thereon.

As demonstrated by FIG. 2, the apparatus 10 is suspended from the shaft 20 of the interior side door knob 22 of the latching mechanism of an exterior door 24 of a dwelling by a user who first axially aligns the upper hole 16 of the planar member 14 with the coaxial door knob 22 shaft 20 on a side of the door knob 22 opposite the door 24, and then linearly moves the planar member 14 along these aligned axes toward the door 24 as illustrated by horizontal arrow 26. The planar member 14 is then lowered or released by the user, as illustrated by downward pointing vertical arrow 28, until the uppermost portion of the upper hole's boundary sits on the top of the knob-carrying shaft 20. This upper boundary of the upper hole 16 thus forms a hook feature that embraces or hooks about the top of the knob-carrying shaft 20 to suspend the remainder of the planar member 14 below the hole 16 from the shaft 20 in order to hang the timer device 18 on the door 24.

As shown in FIG. 2, the timer device 18 of the illustrated embodiment has a two-piece housing that has a generally circular configuration and is made up of a front shell part 30 and a rear shell part 32 that are releasably engagable together to form a hollow interior space within the shell where the electronic components of the timer are supported on the housing shell. The releasable engagement of the housing shell pieces allows access to the interior space to allow a user to replace a battery that powers the electronic timer. Still Referring to FIG. 2, the rear shell part 32 has a smaller diameter rear portion 34 from which it steps up in diameter to a larger front portion 36 to present a flat annular face 38 projecting radially outward to form this transition between the two diameters of the rear shell piece 32. The rear portion 34 of the rear shell piece 32 is seated within the circular lower hole 40 of the planar member 14, which has a diameter generally equal to the cylindrical rear portion 34 of the housing's rear shell piece 32. The rearward facing flat annular face 38 at the transition between the different diameter portions of the rear shell piece 32 seats against the flat front face of the planar member 14 around the lower hole 40. The fit between the smaller diameter rear portion 34 of the rear shell piece 32 is preferably tight enough to retain this piece in place under normal conditions of use of the apparatus, but an adhesive is preferably applied between the annular face 38 of the timer and the front face of the planar member 14 during assembly to further secure the timer device in a fixed condition on the planar carrier.

The front shell piece 30 presents a flat, circular front face 42 of smaller diameter than the front portion 36 of the rear shell piece 32, and the front shell piece 30 tapers smoothly from its larger diameter circular periphery at the engagement to the rear shell piece 32 to this smaller front face 42. An LCD display screen 44 supported within the housing of the timer device is visible at the front face 42 thereof. Push buttons 46 are also presented at this front face 42 of the timer device, the three buttons 46 of the illustrated embodiment including one button for setting an integral number of minutes for the timer to count down, another button for setting an integral number of seconds for the timer to count down instead of or in addition to any minutes entered using the first button, and a third button for starting the timer after setting the interval of time to count down and selectively stopping the timer during counting down of the interval. Simultaneously depressing of the first two buttons, i.e. the minute button and second button, acts to reset the timer to zero.

The illustrated embodiment closely reflects a prototype of the present invention using the electronic timer device commercially available from Vosca Corporation under model number TR810MS, which includes the physical structure and operational elements and functions described, with the primary exception that the rear portion 36 of the rear shell piece 32 is not cylindrical, instead being contoured to slightly increase in diameter toward the front of the timer. The timer features an audible alarm that activates upon expiry of the user-entered interval of time from a starting point in time established by pressing of the start/stop button once the desired interval has been programmed using the second or minute buttons, or both. The audio signal or alarm emanates from the rear of the timer device, hence the mounting of the timer in a hole of the carrier member 14 in the illustrated embodiment so that the front face of the timer is visible from in front of the carrier and the rear face of the timer is unobstructed so as not to muffle the sound from the timer when the programmed interval has lapsed. Vosca's TR810HM is another option of the same housing structure, but being programmable by hour and minute rather than minute and second.

Use of the apparatus of the present invention is preferably as follows. A pet owner or other occupant of a dwelling in a position of responsibility for the household pet, having just let the pet outside through an exterior door of the dwelling or being about to do so, uses one or both of the first two buttons on the electronic timer device to set a desired time interval to be timed by the timer, and then presses the start/stop button to mark the starting point from which the timer starts to count down the selected time interval. The carrier member is hung on the door knob shaft of the exterior door, which is then closed after having let the animal outside if not having been so closed already. The person is then free to go about activities other than monitoring the pet's activities or time spent outside while being reassured that they will not forget to later let the pet re-enter the dwelling, as the alarm of the timer device will provide an audible indication that it is time to let the animal back inside when the user-set time interval has expired. Accordingly, when the timer completes its count down, the audio signal is emanated from the apparatus to serve as an indication to the person that it is time to let the animal back into the dwelling. The person then returns to the door, presses the appropriate button or combination thereof to deactivate the audible alarm and opens the door to allow the animal to re-enter the dwelling.

In addition to the audio signal audibly recognizable by the user as a reminder to let the animal back indoors, the apparatus also serves as a visual reminder that the animal was let outside.

One way to accomplish this dual reminder function is to consistently hang the apparatus on the door only when the animal has been let out by an occupant of the dwelling, and to keep the apparatus in a place of storage distinct and separate from its in-use position hanging on the door when the apparatus is not being used to monitor the outdoor status of the animal. Every time the animal is let outside, only then is the apparatus hung on the door. Accordingly, if the person responsible for the letting the pet back inside has forgotten the pet is outdoors, they will be reminded of this fact even before the audible alarm sounds should they see the apparatus hanging from the door latch actuator when they visit or pass an area from which the interior side of the closed door is visible. The apparatus is therefore preferably of a sufficient size to be easily seen and recognized from a distance. For example, a planar member having a length greater than four inches, and preferably greater than six inches in the vertical direction when hung should project out from behind a conventionally sized door knob or handle. An early prototype produced using a planar rectangular member with rounded corners, similar to those used for "do not disturb" door hanger signs for hotels, had a length of approximately twelve inches, a width of four inches and a 2.5-inch door knob hole positioned with its uppermost point one inch below the upper edge of the member. The apparatus may be even greater than 12-inches long, keeping in mind that height overall height from the bottom of the planar member to the bottom of the knob hole can't exceed the height of the door knob from the floor without requiring flexibility and possibly awkward manipulation for installation, but such a size between eight and sixteen inches nicely balances visibility with storage space efficiency. In general, the dimensions can be modified without detriment to the function of the apparatus.

Preferably the carrier is provided with text, illustration or images indicative of the intended function of the apparatus, so that a person in the dwelling does not inadvertently deactivate the alarm sounding from the apparatus upon expiry of the timer without realizing that the other person responsible for the pet was relying upon that alarm as a reminder to let the animal back in. In the illustrated embodiment, the intention of the apparatus is clearly marked on the front face of the by both a written message indicating that an animal or pet is outside, and an illustration of an animal in an outdoor environment for interpretation by even those who cannot read the written message, for example those unfamiliar with the language of the printed message, young children who haven't yet learned to read, or the illiterate. The image or illustration may be a reproduction of a drawing, painting or photograph.

Figure 5:
FIG. 5 is a rear elevational view of another timer carrying member employing an alternate product logo, but otherwise being the same as that shown in FIG. 4.

As illustrated in FIG. 5, the rear face of the planar carrier that faces the door when hung thereon preferably features text, illustration or images providing a message that opposite that on the front face of the carrier to indicate that the animal is inside the dwelling. In the illustrated embodiment, for consistency between the opposing faces of the carrier, this could be provided by both a written message indicating that an animal or pet is inside, and an illustration of an animal in an indoor environment for interpretation by even those who cannot read the written message. The animal illustrated on the front of the carrier may be the same as that shown on the back. This introduces another way in which the apparatus can be used to provide a visual indicator of the indoor/outdoor status of the animal. Rather than removing the apparatus from the door every time the pet is let back inside, the apparatus is instead flipped around each time the animal transitions between the interior of the dwelling and the exterior outdoor environment. Accordingly, when the animal is outside, the front face of the carrier faces away from the door so that the apparatus message and illustration on the front face are readable and visible to indicate that the animal is outside, while the rear face and the "indoor" message and image thereon face the door and thus are not readily viewable. When the animal is let back in, the rear face of the carrier faces away from the door and the message and illustration on the rear face are readable and visible to indicate that the animal is inside, while the front face and the "outdoor" message and image thereon face the door and thus are not readily viewable. Accordingly, anytime a user of the device is in or passing the area of the door, they can easily check on the indoor/outdoor status of the animal to ensure the pet is never inadvertently left outside. Seeing an indication that the animal is inside the house can provide reassurance to the pet owner that the animal has not inadvertently been left out.

Applicants are currently calling the apparatus the "Kritter Klock" ™, to mark its function as a timer or clock for the monitoring of outdoor time spent by dogs/cats/pets/animals/critters ("Kritters"), and the illustrate phrases printed on the front and rear sides of the carrier member are therefore "The kritter is OUTSIDE" and "The kritter is INSIDE" respectively. Large print and capitalization of the word specifying the inside/outside or indoor/outdoor status of the animal aids in easy visual recognition of the animal's current status from a distance without requiring a close inspection of the apparatus or visual or physical searching of indoor and outdoor environments for the pet.

It will be appreciated that the portion of the apparatus adapted to hang from the knob carrying shaft of a door need not necessarily be a thin planar member, although this structure is small for efficient storage and can be produced easily at relatively little cost. As demonstrated by the aforementioned early prototype, a similar structure is already produced for other door hanging purposes. Also, the part of the carrier that hangs over the knob carrying shaft need not necessarily close fully therearound. For example, "do not disturb" door hangers are known that feature a small split or slit extending from the circular hole in the planar member to one of the side edges thereof to allow hooking of the top portion of the member above the hole around the knob-carrying shaft of a door without having to first pass it over the knob itself. Other examples simply present a curved hook shape at the top of the carrier that is that connects at to a rectangular reminder of the rest of the carrier and is rigid enough hang over knob-carrying shaft without depending fully downward past the knob on both sides thereof.

A carrier member may be produced from plastic, metal, cardstock, paperboard or other relatively thin body of sufficient rigidity to carry the timer device. It will also be appreciated that the timer device may be supported on the carrier in ways other than described and illustrated in detail herein. For example, the aforementioned early prototype features a larger rectangular timer device secured to the carrier by adhesive. Other possible examples include magnetic retention of a timer device, for example using a magnet on the carrier interacting with a ferromagnetic element carried on the timer housing or a magnet on the timer interacting with a ferromagnetic element fixed on the carrier or a carrier made of ferromagnetic material. The aforementioned timers from Vosca each incorporate a magnet for selective attachment to a surface of magnetically attractable material. In other embodiments, the carrier and timer housing may have integrally defined components. For example, it may be possible to produce a plastic member that integrally defines a carrier and part of an openable timer housing so that a separate removable or openable part of the timer housing can be releasably engaged with the integral member to enclose the timer battery between them.

The timer device need not necessarily be electronic, as a mechanical timer could instead be hung from the door knob shaft, but an electronic timer offers a more compact, lightweight configuration with low energy requirements. A small lightweight electronic timer can be easily carried by a structurally simple carrier and can sound an audible alarm for an extended period of time to best ensure the person hears the reminder alarm. Electronic devices capable of operating a timer may be used that are different in physical structure or operational features. For example, an electronic device may be configured to allow user selection from a number of predetermined time periods of different lengths, as opposed to allow user-setting or programming of any desired time interval within a range of possible interval lengths, for example to allow selection from ten to sixty minute timer options increasing by ten minutes from one option to the next. Another embodiment may have only a single selectable interval of time having a fixed non-adjustable value, but of course a much more flexible product giving the user the option to set, adjust or select different intervals to be counted down is greatly preferred.

Although the invention is described in terms of hanging from a knob-type door latch mechanism actuator, it will be appreciated that other door latch mechanisms use handle type levers, and the present invention can be hung over the support shafts of lever type handles just the same. Although the preferred reminder method is described in terms of hanging the reminder apparatus on the exterior door through which the pet enters and exits the dwelling, it will be appreciated that the apparatus could be hung on any door of the dwelling, whether an interior or exterior door. Also, the animal can be let in or out of the dwelling through an exterior door other than that on which the apparatus to hung to provide the reminder.

The timer device may feature visual alarm functionality in addition to the aforementioned audible alarm functionality, whereby even the deaf or audibly impaired can recognize the expiry of the timer and act accordingly to let the animal back into the building. For example, the visual alarm may involve a light source (e.g. an light emitting diode, or LED) switching between an OFF and ON state upon expiry of the timer (preferably from OFF to ON so that the light source is normally inactive to conserve power), switching of such a light source into a FLASHING state from a non-flashing state upon expiry of the timer, or causing some sort of change in the appearance of the display screen (for example flashing of the display time zero-digits) upon expiry of the timer. Like the audible alarm, the visual alarm may continue until receive of a user input acting to provide a stop signal deactivating the alarm. With a visual alarm, a dwelling occupant who cannot hear the audible alarm can still recognize that the timed period has expired. The timer device may be configured to allow user selection between a purely-audible alarm, a visual-only alarm, or a combination of both.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for reminding an occupant of a dwelling to facilitate re-entry of a pet having previously exited the dwelling, the method comprising:
 (a) hanging a timer device at an indoor position hanging from a handle carrying portion of a door latching mechanism inside the dwelling on an interior side of an exterior door of the dwelling, and providing input to the timer device to mark a starting point from which an interval of time is to elapse before the timer provides an indication that the interval of time has expired;
 (b) after having previously let the pet out of the dwelling through the exterior door at which the timer device was hung in step (a), visually recognizing a status of the timer device's position at the exterior door as a visual reminder of an outdoor status of the pet;
 (c) recognizing an alarm signal emitted by the timer device upon expiry of the interval of time as a reminder to let the pet back inside the dwelling; and
 (d) in response to the alarm, manually opening the exterior door at which the timer device was hung in step (a) and allowing re-entry of the pet into the dwelling through said exterior door;
 wherein step (a) comprises hanging the timer device in an orientation in which an outdoor status indicator on a respective side of the timer device is in a viewable condition facing away from the exterior door and an indoor status indicator on an opposing side of the timer device is in a concealed position facing toward the exterior door, step (b) comprises visually recognizing the orientation of the timer device and the resulting viewable condition of the outdoor status indicator as the reminder of the outdoor status of the pet, and step (d) comprises removing the timer device from the handle carrying portion of the door latching mechanism, flipping the timer device around, and re-hanging the timer device from the handle carrying portion of the door latching mechanism in another orientation in which the outdoor status indicator is in the concealed condition facing toward the exterior door and the indoor status indicator on the opposing side of the timer devices is in the viewable condition facing away from the exterior door.

2. The method of claim 1 wherein step (a) comprises setting a user-selected interval of time before marking the starting point from the interval of time is to elapse.

3. The method of claim 1 wherein the alarm signal comprises an audible indication that the interval of time has expired.

* * * * *